United States Patent [19]
Ikegami et al.

[11] Patent Number: 5,647,554
[45] Date of Patent: Jul. 15, 1997

[54] ELECTRIC WORKING APPARATUS SUPPLIED WITH ELECTRIC POWER THROUGH POWER SUPPLY CORD

[75] Inventors: Masashi Ikegami; Toshihiko Matsuhashi; Yoshiya Yamaue, all of Osaka-fu; Takashi Tanaka; Katsunori Hayashi, both of Hyogo-ken; Daizo Takaoka, Osaka-fu, all of Japan

[73] Assignee: Sanyo Electric Co., Ltd., Osaka-fu, Japan

[21] Appl. No.: 343,789

[22] Filed: Nov. 22, 1994

Related U.S. Application Data

[63] Continuation of Ser. No. 189,291, Jan. 31, 1994, abandoned, which is a continuation of Ser. No. 50,979, Apr. 21, 1993, abandoned, which is a continuation of Ser. No. 935,123, Aug. 21, 1992, abandoned, which is a continuation of Ser. No. 643,849, Jan. 22, 1991, abandoned.

[30] Foreign Application Priority Data

| Jan. 23, 1990 | [JP] | Japan | 2-14210 |
| Jan. 23, 1990 | [JP] | Japan | 2-14211 |
| Jan. 23, 1990 | [JP] | Japan | 2/14212 |

[51] Int. Cl.$^6$ .............................. B65H 75/42; B25J 5/00; H02G 11/02
[52] U.S. Cl. .................... 242/390.9; 901/1; 191/12.2 A; 414/909
[58] Field of Search .................. 242/390.9, 390.8, 242/390.6, 403; 901/1, 50; 191/12.2 A; 180/2.1, 168; 414/909, 918

[56] References Cited

U.S. PATENT DOCUMENTS

| 1,049,826 | 1/1913 | Dunlop | 242/397.2 |
| 4,023,744 | 5/1977 | Shutt | 242/397.5 |
| 4,504,023 | 3/1985 | Lauritzen | 242/390.9 |
| 4,637,494 | 1/1987 | Iida et al. | 901/1 X |
| 4,666,102 | 5/1987 | Colbaugh et al. | 242/390.9 |
| 4,736,826 | 4/1988 | White et al. | 901/1 X |

*Primary Examiner*—John M. Jillions
*Attorney, Agent, or Firm*—Darby & Darby

[57] ABSTRACT

An electric working apparatus includes a movable body which is driven by a movement mechanism, and the movable body is provided with a working mechanism such as an articulated robot. The movement mechanism, the working mechanism and etc. are driven by an electric power which is supplied through a power supply cord being extended from a cord reel mechanism fixed on a wall or floor within a working space of the movable body to be connected to the movable body. When the movable body moves in a manner that the movable body goes away from the cord reel mechanism, a tension detection switch is turned-off by a lever, a reel motor is turned-off, and clutch plates are released, and therefore, the power supply cord is wound from the cord reel mechanism by necessary length. When the movable body moves in a manner that the movable body approaches to the cord reel mechanism, the tension detection switch is turned-on by the lever and the clutch plates are engaged to each other, and therefore, the cord reel is rotated by the reel motor to wind the power supply cord.

6 Claims, 5 Drawing Sheets

Fig. 5
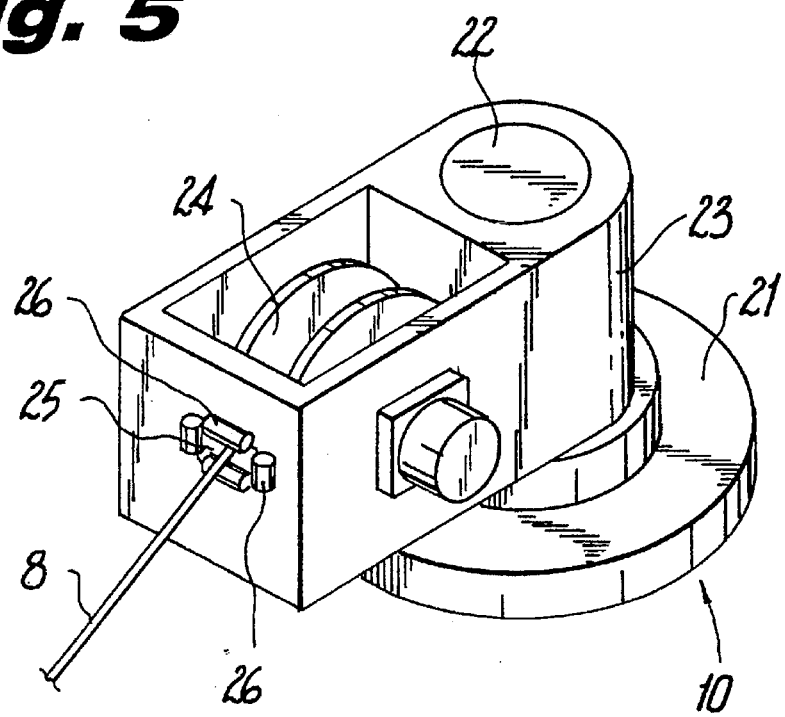
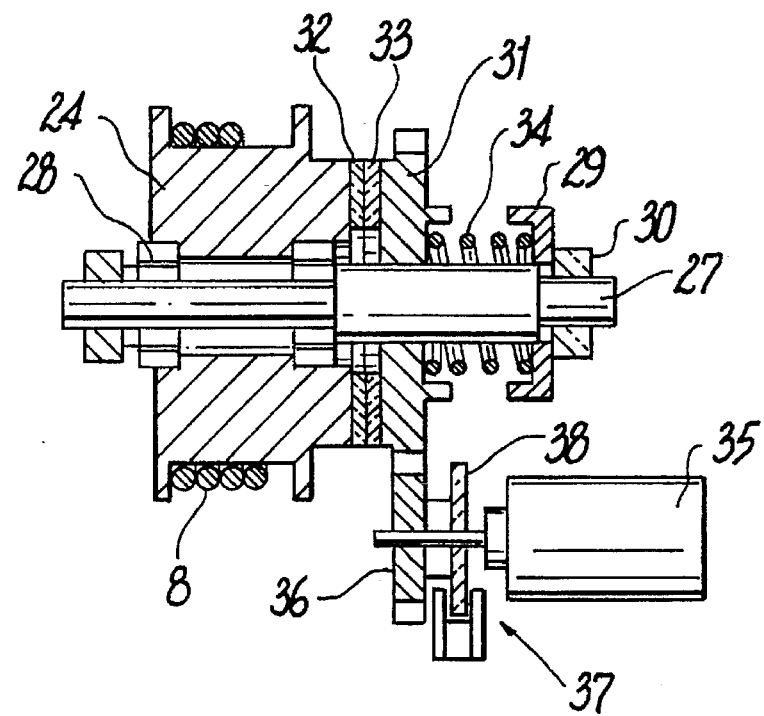
Fig. 6

Fig. 7
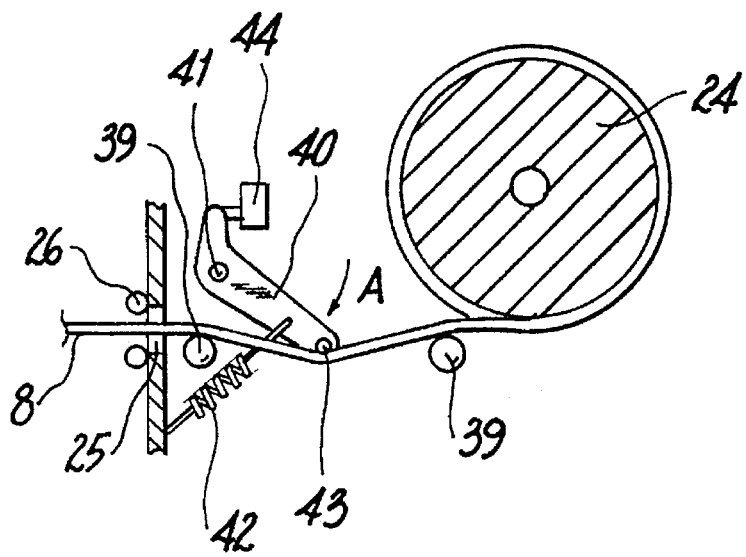
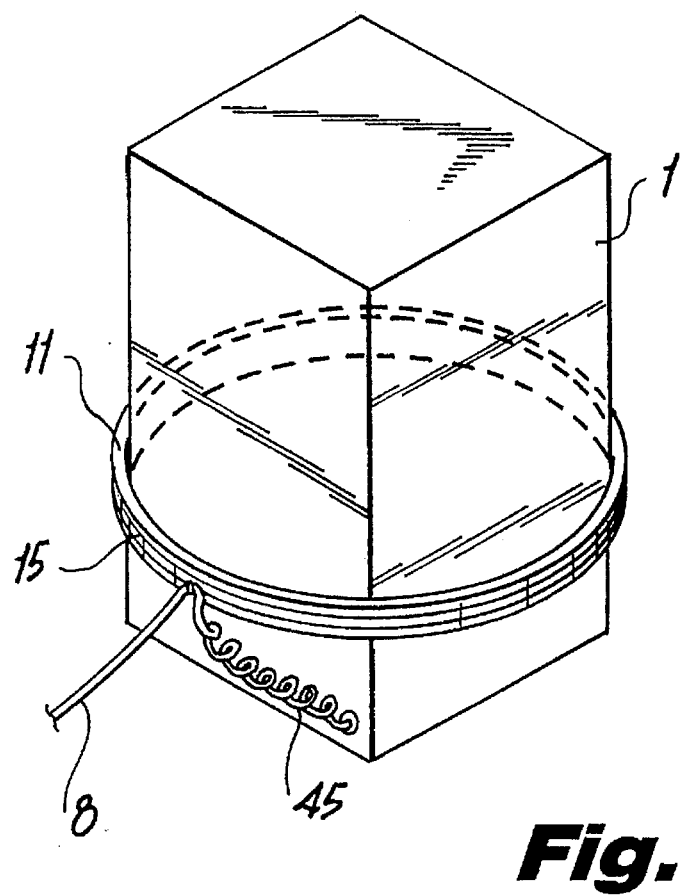
Fig. 8

ELECTRIC WORKING APPARATUS SUPPLIED WITH ELECTRIC POWER THROUGH POWER SUPPLY CORD

This is a continuation of application Ser. No. 08/189,291, filed Jan. 31, 1994 now abandoned which is a continuation of application Ser. No. 08/050,979, filed Apr. 21, 1993 (now abandoned) which is a continuation of application Ser. No. 07/935,123, filed Aug. 21, 1992 now abandoned which is a continuation of application Ser. No. 07/643,849, filed Jan. 22, 1991 now abandoned.

BACKGROUND OF THE INVENTION

1. Field of the Invention

The present invention relates to an electric working apparatus. More specifically, the present invention relates to an electric working apparatus which includes a movable body supplied with an electric power through a power supply cord and performs work such as transfer of components, cleaning and so on.

2. Description of the Prior Art

One example of such a kind of prior art is disclosed in Japanese Patent Application Laid-Open No. 62-268305, wherein a movable body is provided with a cord reel mechanism for winding a power supply cord which is connected to a plug socket provided on a wall.

In order to enlarge a working space of such a movable body, it is necessary to make a length of the power supply cord longer, and therefore, the cord reel mechanism becomes large.

In the above described prior art, since the cord reel mechanism is provided on the movable body, the movable body becomes large and a weight thereof is increased due to a large-sized cord reel mechanism, and this is not favorable in cost.

In general, a cord reel is driven by a motor to wind or unwind the power supply cord in the cord reel mechanism; however, if the cord reel is controlled only by on/off of the motor, a large change occurs in tension of the power supply cord between a timing when the motor is turned-on and a timing when the motor is turned-off. Therefore, it was impossible to smoothly and stably wind-up the power supply cord in the cord reel mechanism of the prior art.

In order to solve such a problem, a method wherein the tension of the power supply cord is kept at constant by using a hysterisis clutch, for example; however, a further problem occurs in generation of noise and durability because the motor is always driven in this method.

In addition, in the above described prior art, when the movable body moves, the power supply cord twines about the movable body so that the movement of the movable body and the work by a working mechanism may be prevented.

SUMMARY OF THE INVENTION

Therefore, a principal object of the present invention is to provide an electric working apparatus capable of operating in a large working space while the movable body is not large-sized and a weight thereof is not increased.

Another object of the present invention is to provide an electric working apparatus in which it is possible to smoothly and stably wind or unwind a power supply cord even if a movable body is moved.

Another object of the present invention is to provide an electric working apparatus capable of stably applying predetermined tension to a power supply cord without generation of noise and deterioration of durability.

The other object of the present invention is to provide an electric working apparatus in which a power supply cord does not twine about a movable body even if the movable body moves.

An electric working apparatus in accordance with the present invention comprises: a movable body provided with working means; a power supply cord connected to the movable body for supplying an electric power to the movable body; cord reeling means fixedly provided a predetermined position that is separated from the movable body for reeling the power supply cord.

If the movable body moves within a working space, in accordance with movement thereof, the power supply cord can be wound or unwound by the cord reeling means fixedly provided on a wall or floor of the working space. If tension adjusting means for adjusting the tension of the power supply cord is provided in the cord reeling means, the power supply cord is kept in a state where predetermined tension is applied to the power supply cord.

In accordance with the present invention, since the cord reeling means is fixedly provided on a wall or floor of a working space rather on a movable body, even if the power supply cord is made longer and thus the cord reeling means is large-sized in order to correspond to the size of the working space, not only the movable body is not necessary to be large-sized but also the weight thereof does not increase. Therefore, it is possible to provide an electric working apparatus in which a working space is large but a movable body is compact and light.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIGS. 1 to 7 are illustrative views showing one embodiment in accordance with the present invention, wherein FIG. 1 is a perspective view showing a whole electric working apparatus;

FIG. 2 is a cross-sectional view showing a major portion of a movable body;

FIGS. 3 and 4 are cross-sectional views of a circular rail at different positions;

FIG. 5 is a perspective view showing internal structure of a cord reel mechanism;

FIG. 6 is a cross-sectional view showing internal structure of a cord reel mechanism; and FIG. 7 is a cross-sectional view showing a tension detecting mechanism incorporated inside a cord reel mechanism.

FIG. 8 is a perspective view showing a movable body of an electric working apparatus of another embodiment in accordance with the present invention.

DETAILED DESCRIPTION OF THE PREFERRED EMBODIMENTS

Figure 1:
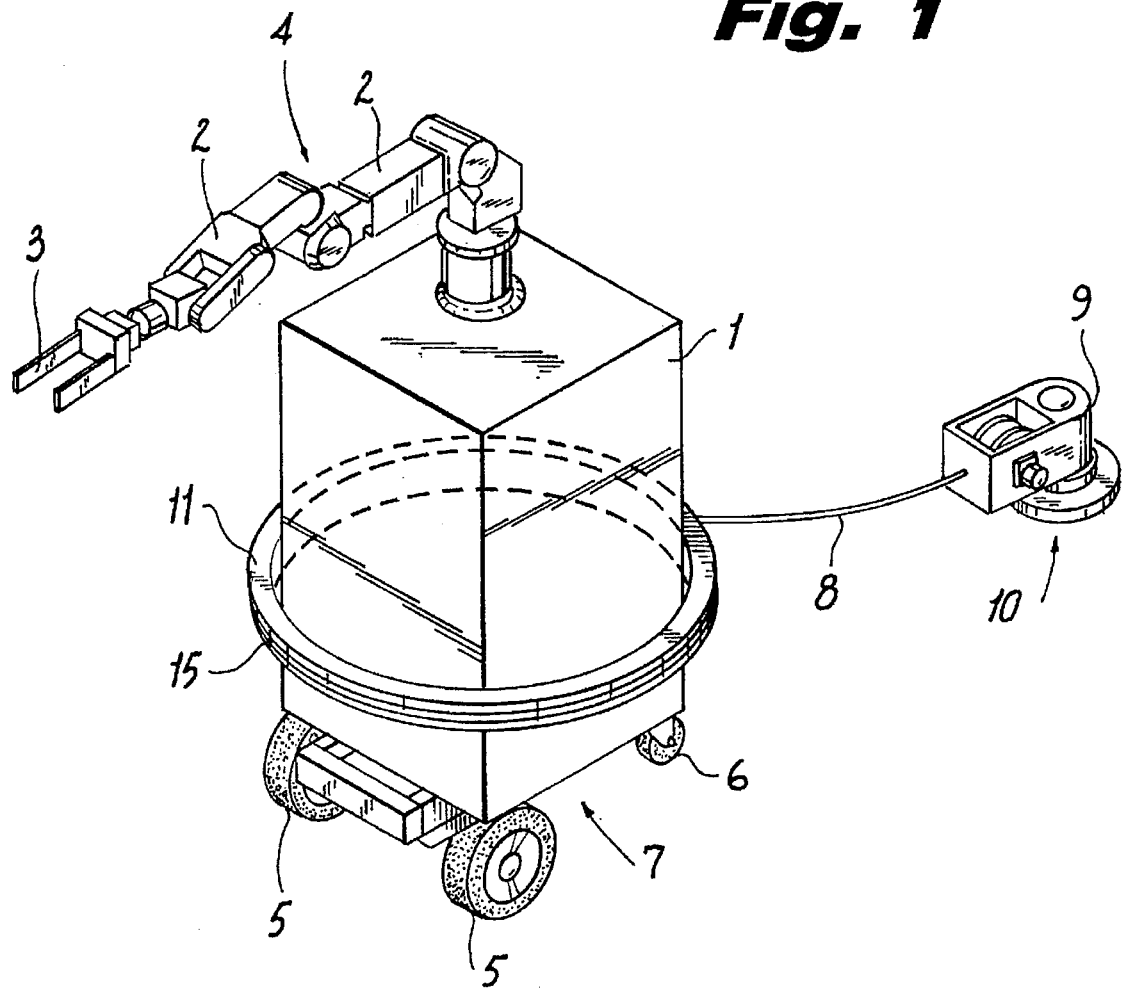

With reference to FIG. 1, an electric working apparatus of this embodiment shown includes a movable body 1 which is provided with an articulated robot having a plurality of arms 2 and a hand 3, that is, a working mechanism 4 on an upper portion thereof and a movement mechanism 7 which is constructed by wheels 5 and 6, a motor (not shown) for driving for rotation of the wheels and steering means (not shown) for steering the movable body 1 at a lower portion thereof.

A power supply cord 8 is connected to the movable body 1, and the power supply cord 8 is extended from a cord reel mechanism 9 which is fixed on a fixed portion, for example, a floor 10 of the working space. As described later, the cord reel mechanism 9 has a function of supplying an electric power to the movable body 1 through the power supply cord 8 and a function of unwinding or winding the power supply cord 8 in a state where the power supply cord 8 is applied predetermining tension.

Figure 2:
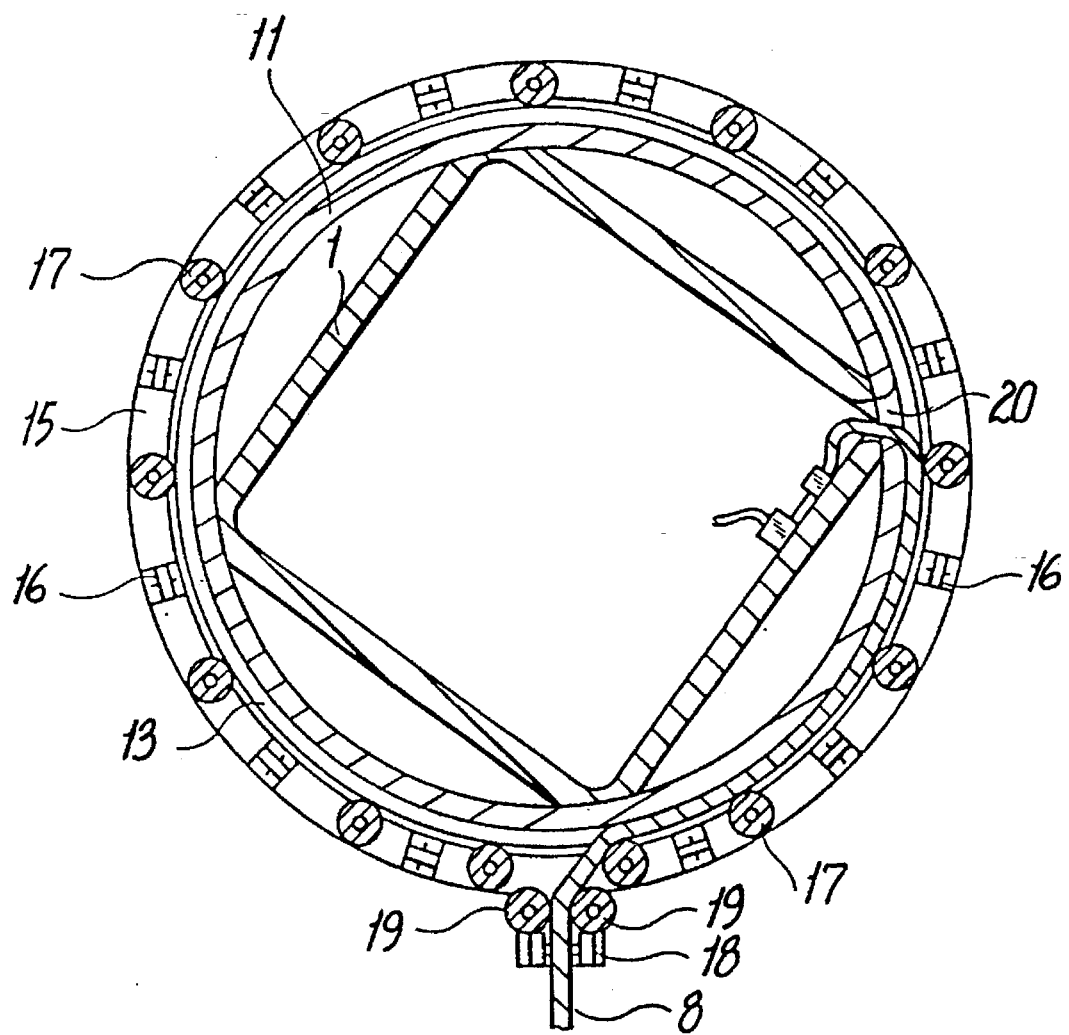
Figure 3:
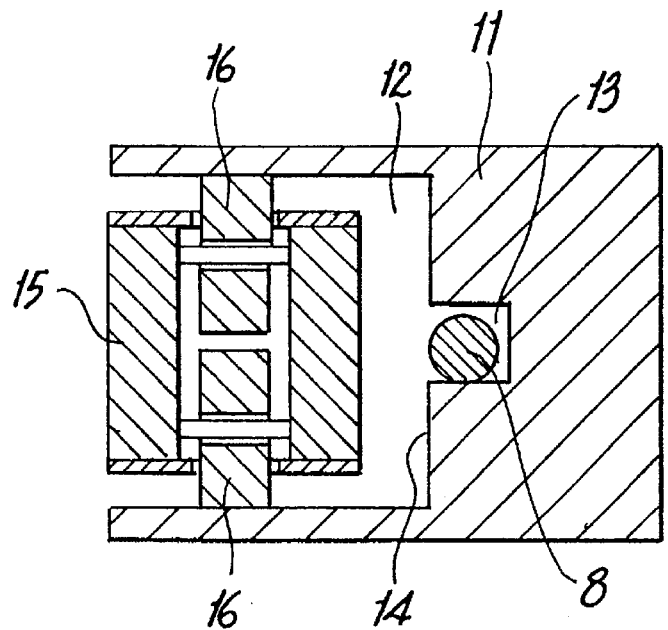
Figure 4:
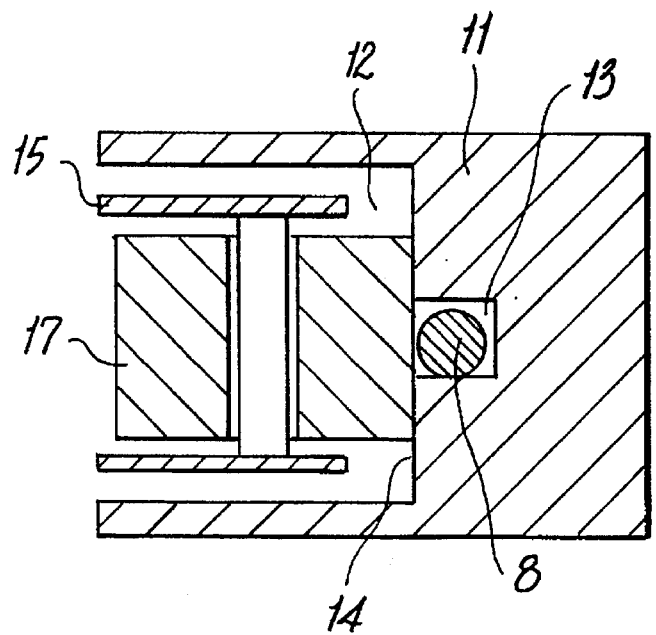

With reference to FIG. 2 to FIG. 4, a circular rail 11 which is formed with a groove 12 at outside thereof is attached to the movable body 1 so that the movable body 1 is surrounded with the circular rail 11. A cord containing groove 13 is formed on a bottom surface 14 of the groove 12, and a rotation ring 15 is supported in the groove 12 in a rotatable manner by a plurality of supporting rollers 16. A pressure roller 17 attached to the rotation ring 15 in a rotatable manner moves from place to place on the bottom surface 14 so as to press the power supply cord to be contained in the cord containing groove 13. In addition, a cord guide port 18 is formed at a given position on the rotation ring 15, and the cord guide port 18 is provided with guide rollers 19 at the right and the left thereof to guide the power supply cord 8 being extended from the cord reel mechanism into an inside of the groove 12. In addition, the reference numeral 20 denotes a conducting port which is communicated to the cord containing groove 13 of the groove 12 and an inside of the movable body 1, and conducts the power supply cord 8 into the movable body 1. An electric power is supplied to electric devices of the movable body 1, that is, the working mechanism 4, moving mechanism 7 and etc. via the power supply cord 8 which is conducted into the movable body 1 through the conducting port 20.

With reference to FIG. 5, the cord reel mechanism 9 includes a fixing base 21 which is attached to and fixed on the floor 10, and the fixing base 21 is provided with a pivot 22. A reel housing 23 is provided in a manner that the same can swing around the pivot 22, and the reel housing 23 is provided with a cord reel 24 in a rotatable manner. A cord withdrawing port 25 includes a plurality of guide rollers 26 and the cord withdrawing port 25 is formed at an end surface of the reel housing 23. The power supply cord 8 wound on the cord reel 24 is withdrawn through the cord withdrawing port 25 to be connected to the movable body 1.

With reference to FIG. 6 which shows internal structure of the cord reel mechanism 9, the cord reel 24 is supported on one end of a shaft 27 via a bearing 28 in a rotatable manner, and a cover 29 is fixed at the other end of the shaft 27 by a nut 30. In addition, a gear 31 is fixed to the shaft 27 adjacently to the cord reel 24, and clutch plates 32 and 33 are provided on surfaces of the cord reel 24 and the gear 31 facing to each other, respectively. The gear 31 is pressed toward the cord reel 24 by a spring 34 which is provided between the cover 29 and the gear 31, and therefore, the clutch plates 32 and 33 are slipped. A motor 35 rotates the cord reel 24 via a gear 36 which engages with the gear 31. In addition, the reference numeral 37 denotes a braking device having a braking plate 38 which is fixed to an output shaft of the motor 35.

In addition, a tension detecting means shown in FIG. 7 is incorporated inside of the cord reel mechanism 9. More specifically, two guide rollers 39 are arranged between the cord withdrawing port 25 and the cord reel 24, and above the two guide rollers 39, there is provided a lever 40 which is supported by a shaft 41 in a rotatable manner and biased in a direction of an arrow mark A by a constant spring force of a spring 42. The lever 40 presses the power supply cord 8 at a position between the guide rollers 39 by a pin 43 which is provided on one end of the lever 40. A detection switch 44 is opened or closed in response to movement of the other end of the lever 40 to detect tension of the power supply cord 8.

In the following, an operation of this embodiment shown will be described.

The cord reel mechanism 9 is arranged on the floor 10 at an approximately center of the working space. For example, in a case where the movable body 1 is used as a cooking robot which withdraws material for foods from a refrigerator and transfers the same to an inside of a heating chamber of an electronic oven and transfers cooked foods to a counter when the heating by the electronic oven is completed, the movable body 1 is arranged at an approximately center of the working space wherein such a refrigerator, electronic oven, counter and etc. are arranged. Then, the movable body 1 moves within such a working space to perform predetermined works by means of the working mechanism 4.

In working, when the movable body 1 is moved toward a direction that the movable body 1 goes away from the cord reel mechanism 9, the power supply cord 8 is pulled by the movable body 1. At this time, the lever 40 constituting the tension detection means is rotated in a direction reverse to the arrow mark A (FIG. 7) since the pin 43 is pushed upward by the power supply cord 8. Therefore, the detection switch 44 is opened and thus the motor 35 is turned-off. In addition, since the output shaft of the motor 35 is fixed by the braking device 37, the gears 36 and 31 cannot be rotated. However, since the clutch plates 32 and 33 are slipped because the gear 31 is pressed toward the cord reel 24 by the spring 34, the cord reel 24 supported via the bearing 28 is rotated as the power supply cord 8 is pulled by the movable body 1, and therefore, the power supply cord 8 is unwound by necessary length so that the tension of the power supply cord 8 is kept at a predetermined value. The tension at a timing when the clutch plate 32 and 33 start to be slipped can be adjusted by a pressing force of the spring 34 which is dependent on the degree of clamping of the nut 30.

Inversely, when the movable body 1 moves toward a direction that the movable body 1 approaches to the cord reel mechanism 9, the power supply cord 8 becomes to be loosened in accordance with the movement of the movable body 1. At this time, the detection switch 44 is closed since the lever 40 constituting the tension detecting means is rotated in a direction of the arrow mark A by the spring 42, and thus, the motor 35 is turned-on and the output shaft thereof is rotated. Since the gear 31 is pressed toward the cord reel 24 by the spring 34, a rotation force of the output shaft of the motor 35 is transferred to the cord reel 24 through the gears 36 and 31 and the clutch plates 33 and 32. Therefore, the cord reel 24 is rotated to wind the power supply cord 8 by necessary length. When the motor 35 is rotated, the tension of the power supply cord 8 is low, and therefore, the clutch plates 33 and 32 are not slipped. If the tension of the power supply cord 8 reaches to a predetermined value when the power supply cord 8 is wound, the lever 40 of the tension detecting means is rotated in a direction reverse to the arrow mark A, and therefore, the detection switch 44 is opened and the motor 35 is turned-off.

By the above described operation, the tension of the power supply cord 8 can be automatically kept at a value between a value at a timing when the detection switch 44 is closed due to dip of the power supply cord 8 and a value at a timing when the clutch plate 32 and 33 start to be slipped in a state where the detection switch 44 is opened and the motor 35 is turned-off.

In addition, at this time, in the cord reel mechanism 9, since the reel housing 23 automatically swings or rotates around the pivot 22 since the same is pulled by the tension generated on the power supply cord 8, the cord withdrawing port 25 can be automatically oriented toward the movable body 1 in accordance with the movement of the movable body 1. This embodiment is constructed such that the rotation of the reel housing 23 around the pivot 22 occurs a tension value lower than that at a timing when the detection switch is opened and thus the motor 35 is turned-off.

On the other hand, in the movable body 1, positional relationship thereof with respect to the cord reel mechanism 9 in accordance with the movement of the movable body 1 is changed. In this embodiment shown, if and when a direction viewing from the movable body 1 to the cord reel mechanism 9 is changed due to the movement of the movable body 1, the cord guide port 18 is oriented toward the cord reel mechanism 9 because the rotation ring 15 within the groove 12 is rotated by the tension of the power supply cord 8, and at this time, the pressure roller 17 presses the power supply cord 8 to contain the power supply cord 8 in the cord containing groove 13. Therefore, even if the direction viewing from the movable body 1 to the cord reel mechanism 9 is changed due to the change of the positional relationship between the movable body 1 and the cord reel mechanism 9 in accordance with the movement of the movable body 1, the power supply cord 8 does not twine around the movable body 1, and therefore, the movement and the work of the movable body 1 cannot be prevented.

In addition, in this embodiment shown, the power supply cord 8 of the length corresponding to one rotation of the rotation ring 15 can be contained in the cord containing groove 13, and thus, it is possible to deal with the movement of the movable body 1 until the rotation ring 15 is rotated by one rotation. However, in a case where the movable body 1 is moved over a large distance, if it is required to deal with the movement of the movable body 1 corresponding to a few number of rotations of the rotation ring 15, it may be considered that the cord containing groove 15 is made wider.

In another embodiment in accordance with the present invention shown in FIG. 8, the cord containing groove 13 and the pressure roller 17 of the movable body 1 described in the previous embodiment are omitted, and the power supply cord 8 from the cord reel mechanism 9 is directly fixed at a given position of the rotation ring 15 which is provided in the groove 12 of the circular rail 11 in a rotatable manner, and in turn connected to a curled cord 45 at that fixing position. Then, the curled cord 45 is conducted into the movable body 1. In addition, the remaining portions of the movable body 1 and the structure of the cord reel mechanism 9 are similar to that of the previous embodiment.

In this embodiment shown, the rotation ring 15 can be rotated by a length that the curled cord 45 can be extended, and thus when the direction viewing from the movable body 1 to the cord reel mechanism 9 is changed due to the movement of the movable body 1, the position at which the power supply cord 8 is fixed is oriented toward the cord reel mechanism 9 because the rotation ring 15 is rotated by the tension of the power supply cord 8. Therefore, even if the direction viewing from the movable body 1 to the cord reel mechanism 9 is changed when the movable body 1 is moved, there is no fear that the power supply cord 8 winds around the movable body, or becomes bent or folded.

In addition, it is the same as the previous embodiment that an electric power is supplied to the working mechanism 4, the movement mechanism 7, and etc. by the curled cord 45 being conducted into the movable body 1. Furthermore, although the working mechanism 4 and the movement mechanism 7 are omitted in FIG. 8, it is needless to say that the movable body 1 is also provided these mechanisms in this embodiment as similar to the previous embodiment.

Moreover, in the above embodiments, the lever 40 and the detection switch 44 are used to detect the tension of the power supply cord 8; however, a distortion detection switch, for example may be used for such a tension detection means.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electric working apparatus comprising:
   a movable body provided with working means;
   a power supply cord connected to said movable body for supplying an electric power to said movable body, a circular rail surrounding said movable body and formed with a groove on the outside thereof, and a cord containing groove formed on one side of said groove for containing said power supply cord therein; and
   cord reeling means fixedly provided at a predetermined position apart from said movable body for reeling said power supply cord.

2. An electric working apparatus in accordance with claim 1, wherein said cord reeling means includes a reel for winding or unwinding said power supply cord, and tension adjusting means for adjusting tension on said power supply cord as it is extended from said reel.

3. An electric working apparatus in accordance with claim 2, wherein said tension adjusting means includes tension detecting means for detecting the tension on said power supply cord, and a motor driven in response to an output of said tension detecting means for rotating said reel via an output transmission means.

4. An electric working apparatus in accordance with claim 3, wherein said tension adjusting means includes braking means for fixing said output transmission means when said motor is not driven, and clutch means provided between said output transmission means and said reel for causing said reel to slip with respect to such output transmission means when more than a predetermined value of tension is applied to said power supply cord.

5. An electric working apparatus in accordance with claim 1, wherein said cord reeling means includes rotating means which rotates in accordance with a change of positional relationship between said movable body and said cord reeling means.

6. An electric working apparatus in accordance with claims 1 further comprising a rotation ring supported within said groove of said circular rail in a rotatable manner and having a cord guide port, and a pressure roller attached to said rotation ring in a rotatable manner and transferred from place to place within said groove to press said power supply cord being conducted through said cord guide port to press the power supply cord in to said cord containing groove.

* * * * *